Sept. 18, 1928.  1,684,595
W. PARKE
OVEN AND BROILER RACK HANDLING DEVICE
Filed Oct. 26, 1925  2 Sheets-Sheet 1
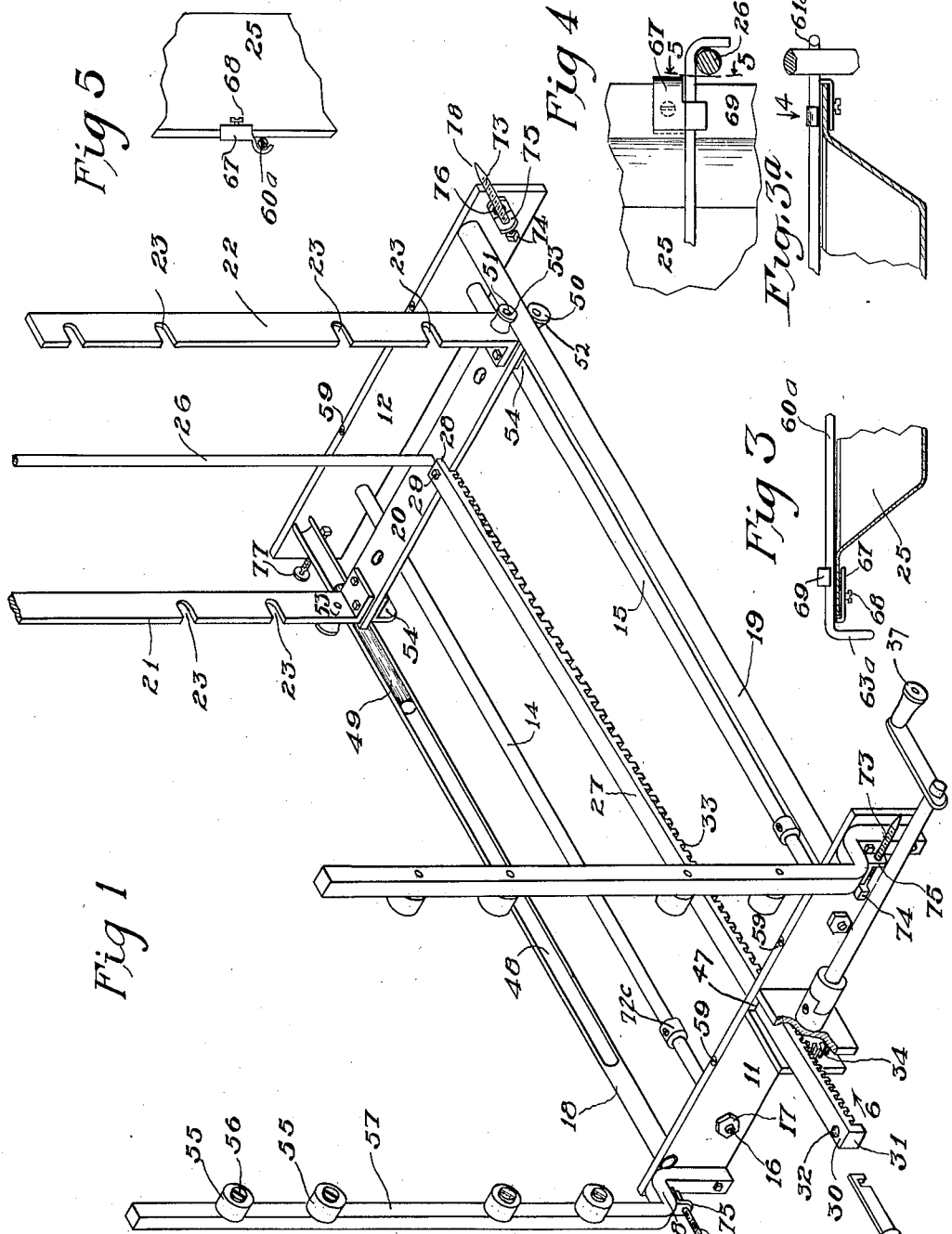

Sept. 18, 1928.  
W. PARKE  
1,684,595  
OVEN AND BROILER RACK HANDLING DEVICE  
Filed Oct. 26, 1925  2 Sheets-Sheet 2
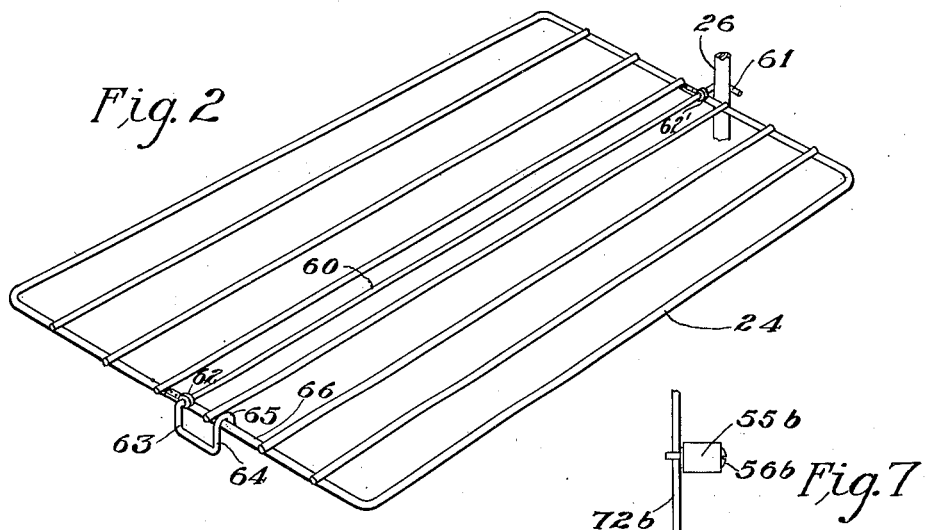
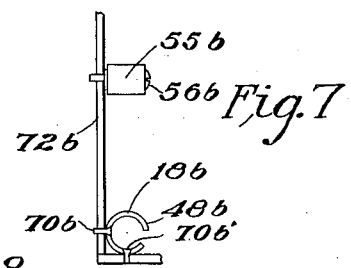
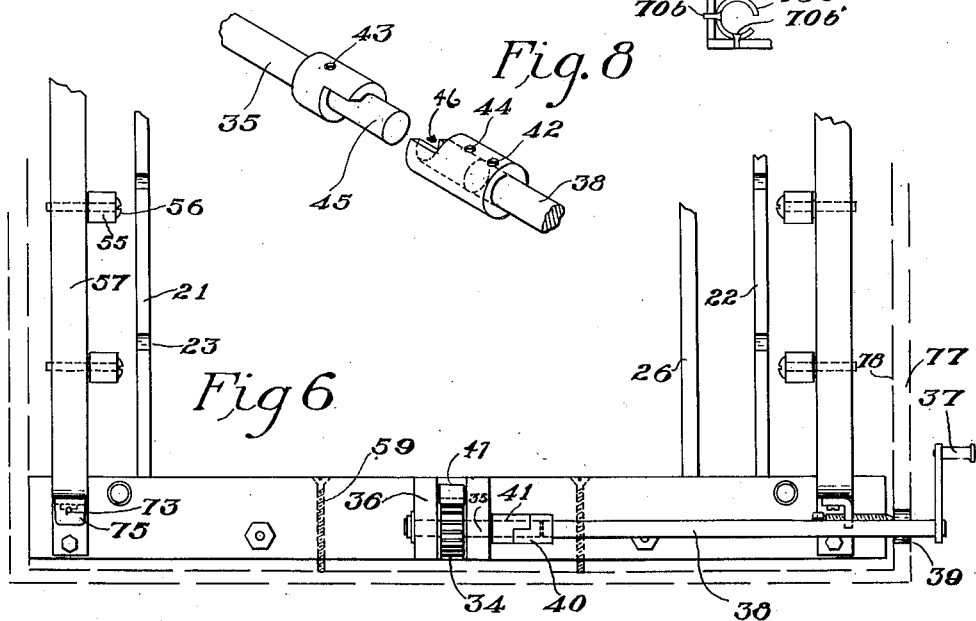
INVENTOR  
WILLIAM PARKE  
BY  
ATTORNEY Patented Sept. 18, 1928.

1,684,595

UNITED STATES PATENT OFFICE.

WILLIAM PARKE, OF NEW YORK, N. Y.

OVEN AND BROILER RACK HANDLING DEVICE.

Application filed October 26, 1925. Serial No. 64,840.

This invention, like that set forth in my application Serial Number 7,052, allowed September 15, 1925, is directed to the provision of improved means for advancing and retracting food supports, such as removable racks and broiler pans, in a manner favorable to an inspection or turning, or a basting, or other operation incidental to baking or broiling, or the like,—enabling such operations to be executed more safely and more expeditiously than heretofore.

As noted in my mentioned application, in the use of ordinary cooking stoves, whether employing gas or electricity or wood or coal, in order to turn or baste or otherwise treat a roast or a bakery product, or the like, the cook or housewife commonly wraps cloths about her hands or provides equivalent protection in order to advance a rack or broiling pan out of an oven. This is always a difficult task involving serious risks of burning, either by contact with a stove part or by reason of a spattering of hot grease, or the like; and burns upon the hands and arms of the cooks or housewives concerned are of common occurrence.

It is an object of this invention to provide improved mechanical means for the advancing or retracting of food supports; and the improvements of my invention herein described comprise parts which may either be built into ovens by the original manufacturers of stoves or may be constructed and marketed as separate articles, suitable for installation in stoves of familiar types.

As compared with the organizations described in my mentioned prior application, this invention is unique in several respects, including the following:
It is an object of this invention to provide racks or other food supports with means thereon for their connection with a retracting arm, this construction rendering it possible for the user, by the rotation of a shaft extending longitudinally of such food supports, to exempt the same from manipulation by means such as the mentioned retracting arm, so that, if desired, the food supports may be tilted or entirely withdrawn from an oven.

It is an object of my present invention to provide advancing means distinct from means for retracting racks or other food supports; and preferred embodiments of my invention may comprise transversely extending bridges, movable in guides, each bridge carrying a plurality of rack-advancing arms. These are preferably spaced apart in such manner as to apply pressure near opposite rear or inner corners of a food supporting rack, or the like, and the mentioned retracting arm may be interposed therebetween.

It is a further and important object of my present invention to provide a rack-handling organization suitable to be installed in ovens unprovided with lateral shelves or ledges for the reception of food supports such as ordinary racks or broiling pans; and this feature of my invention is of especial interest and importance, as rendering it practicable to provide ovens with enameled linings, or with other linings of any preferred character, embodying no horizontal ledges such as have heretofore been regarded as indispensable for the support of racks, or the like.

Other objects of my invention, including a novel use of fixed rollers for the support of racks advanced or retracted in the manner referred to, and including also novel means for the retention of rack-handling organizations within ovens, and including also novel means for the attachment of longitudinal shafts to broiler pans, and special means for the advancing and retracting of the mentioned bridge (carrying substantially vertical rack-handling arms provided with notches at substantially the same levels as, or slightly above, the mentioned rollers) may be best understood from the following description of alternative embodiments thereof, taken in connection with the appended claims and the accompanying drawings, in which:

Fig. 1 is a perspective view of a rack-handling organization adapted to be removably inserted in an oven, parts being broken away.

Fig. 2 is a similar view of a slidable and removable oven rack suitable for use in an organization of the character illustrated in Fig. 1, or in an alternative organization in which parts, equivalent to some of those illustrated in Fig. 1 are built into an oven.

Fig. 3 is a longitudinal section of a front or outer part of a broiling pan especially equipped for use in connection with an organization such as is shown in Fig. 1.

Fig. 3ª is a view corresponding to Fig. 3, but showing the inner end of said pan on a slightly enlarged scale.

Fig. 4 is a fragmentary plan view, taken substantially as indicated by the arrow 4 of Fig. 3.

Fig. 5 is a vertical sectional detail view, taken substantially as indicated by the line 5—5 of Fig. 4.

Fig. 6 is a front elevational view, taken from the front and substantially as indicated by the arrow 6 of Fig. 1, with parts broken away.

Fig. 7 is a sectional detail view corresponding to the lower left portion of Fig. 6, but suggesting the permanent installation of rollers and guide elements within ovens, as by the manufacturers thereof.

Fig. 8 is a detail perspective view, showing a preferred type of coupling for use in connection with an actuating crank, as hereinafter described.

Referring to the details of that specific embodiment of my invention chosen for purposes of illustration, 11 and 12 may be respectively the front and rear elements of a removable frame suitable for insertion in an ordinary oven.

These elements when used, are intended to be of such dimensions as to be insertable through an oven door, preferably without necessitating disassociation from longitudinally extending elements such as rods 14 and 15, shown as provided with threaded ends 16, carrying nut 17, or such as the tubular elements 18 and 19 terminating near the upper and outer corners of the front and rear elements 11 and 12.

Overlying the rods 14 and 15, or their equivalents, and guided by the tubular elements 18 and 19, or their equivalents, I show a movable bridge 20 as carrying, near its respective ends, rack-advancing uprights or arms 21 and 22. These are respectively provided with a plurality of notches 23, suitable for the reception of food supports or shelves, such as racks 24 of the general character illustrated in Fig. 2, or such as broiling pans 25 of the general character illustrated in Fig. 3; and between the mentioned rack-advancing arms, or their equivalents, these arms being preferably spaced apart so widely as to engage racks, or the like, near the respective rear corners thereof, I may dispose an additional upright, such as the rack-retracting arm 26, shown as a mere rod rigidly secured to the transversely extending bridge or plate 20. Whether or not I thread one end of this rod, I may adapt it to interfit with either a central hole or lateral holes in plate 20.

The bridge or plate 20, and the mentioned upright arms secured thereto, may be manipulated in any preferred way, as by means of a forwardly extending strap or tongue 27, the inner end 28 thereof being shown as secured to the bridge 20 by a rivet or bolt 29, and the outer end 30 thereof being optionally provided with a terminal projection 31, engageable by an interfitting tool, (not shown) or with an aperture 32, engageable by a mere hook; and, if desired, the tongue 27 may be adapted to serve as a rack. This may be done in any of the various ways illustrated in my mentioned prior application, or by the mere provision of teeth 33 upon the lower surface thereof, these teeth being engageable by a suitable pinion 34, shown as secured upon a shaft 35 extending through a bracket or brackets 36, supported by the front frame element 11, or its equivalent. Means such as a crank 37 having a shaft 38 insertable through an opening 39 and inwardly terminating in a special coupling 40, adapted to interfit with a co-operating coupling 41 upon the shaft 35, may then be employed to rotate the pinion 34, thereby advancing or retracting the bridge 20 and the mentioned arms secured thereto or integral therewith.

As best shown in Fig. 8, when I use the described coupling device on the inner end of an operating crank, the respective mating parts 40 and 41 may be permanently secured in place on the shafts 38 and 35, or their equivalents, by means such as rivets or screws 42 and 43; and means such as an additional screw 44, adapted to be tightened against a projecting portion 45 of one of the mentioned shafts, as the shaft 35, may be employed to retain the mentioned parts in coacting relationship, when comparative permanence of connection is desired,—the projecting portion 45 being adapted to enter a socket 46 in the mating part.

The strap or tongue 27 is shown as secured centrally of the bridge 20; and it may be guided, in the case of organizations comprising the described frame, by an opening 47 in the front element 11; and, even when the connection between the elements 20 and 27 is entirely rigid, I consider it advantageous to provide either guidance or rolling supports (or both guidance and rolling supports) for the outer ends of the mentioned bridge. For example, I may provide lateral openings 48 in the tubular elements 18 and 19, to permit the insertion therein of substantially cylindrical members 49, rigidly secured, as by welding to the respective ends of the bridge 20; and I may also provide a roller or rollers, either cylindrical or concaved—or one cylindrical (50) and the other concaved (51). When used, these rollers may be secured by means such as screws or bolts 52 and 53, shown as projecting respectively from brackets 54 and from the lateral faces of the rack-advancing arms 21 and 22. It will be noted that the cylindrical members 49 are intended to move longitudinally within the channels 48, holding the bridge 20 in its intended transverse relationship to an oven; and the expediency of using the same, alternatively or in addition to rolling supports of the general character referred to, may depend upon the magnitude of an installation and also upon whether or not means such as the crank 37, rather than a mere hook engaging the hole 32 in the end of the tongue 27, are to be used in imparting movement to the bridge 20.

Alike in built-in embodiments of my invention and in such embodiments of my present invention as are designed for installation in used stoves (originally unequipped with rack-handling devices) the mentioned racks 24, or other suitable food supports, may rest at their forward ends upon inwardly projecting rollers such as are shown in Fig. 1 at 55. These rollers are disposed in pairs at the opposite sides of an oven, near the front thereof, and are shown as revoluble upon fixed axes provided by rivets, bolts or screws 56, entering uprights 57, which are shown as secured near the opposite ends of the front frame element 11, each of the mentioned uprights being preferably provided, as at 58, with an offset which is effective to bring the roller-carrying portions thereof to the extreme front of an oven.

It will be obvious that an organization of the general character described might be inserted either in an upright or in an inverted position within an oven, any preferred means being employed for its secure retention therein. For example, means such as screws 59 may be employed to secure the entire organization either to the top or to the bottom of an oven; but, in any case, the racks 24, or other food supports are intended to be provided with means such as longitudinally extending locking shafts 60, inwardly terminating in fingers 61, by which they may be subjected to control by the rack-retracting arms 26. As shown, each rack 24 is provided with bearing clips 62, 62', near the centers of the front and rear ends thereof; and the forward end of each shaft 52 may be provided with any suitable handle 63, the illustrated handle being upwardly rebent at 64 and terminally provided with a hook 65, adapted to assure its normal retention in such a position as to establish the horizontality of the finger 61, at the opposite end of the shaft 60. It will be obvious that a rotation of the handle 63 through an angle of 90°, more or less, as by lifting the hook 65 from its position of contact with the transverse front element 66 of the rack 24, is effective to release the finger 61 from its position of engagement at the rear of the arm,—permitting the rack to be slightly advanced, out of the notches 23 in arms 22, and to be tilted, if desired (incidentally to a basting operation, or the like) or to be entirely withdrawn, as for re-insertion at a different level.

In Figs. 2–5 inclusive, I show how locking shafts 60ª provided with terminal fingers 61ª may, if desired, be secured to broiling pans 25, in order to subject them to control in the manner just described. For example, I may employ removable clips 67, shown as retained, by set screws 68, upon the end portions of a pan, each clip comprising a bearing element 69, to hold a shaft 60ª in place, while permitting rotation thereof by means such as handles 63ª. As intimated above and as indicated in Fig. 6, the rack-retracting arms or posts need not be centrally positioned; but I prefer that they be distinct from arms 21 and 22.

When racks and rack-manipulating means of the general character described are to be provided in new stoves, as by the manufacturers thereof, I may dispense with many of the frame elements above described, supporting guides such as are shown at 18ᵇ, Fig. 7, in any suitable way, as by means of rivets, screws or bolts, 70ᵇ extending through a lateral wall, or by means of rivets, screws or bolts 70ᵇ' extending through a bottom or top wall,—or by such means extending in two directions at right angles in such manner as to hold a lateral lining plate or side wall and a top plate or bottom plate in their intended relationship,—care being taken that the heads of the screws 70ᵇ and 70ᵇ' do not so project as to interfere with the sliding movement of cylindrical guide elements such as are shown at 49 in Fig. 1, if these are to be used; and rollers 55ᵇ may in any event optionally be secured, as by means of bolts or rivets 56ᵇ, directly to a vertical plate or wall 72ᵇ. Adjustable stops may be provided, as at 72ᶜ (See Fig. 1) to limit the forward movement of the bridge 20.

It being, as mentioned above, an important merit of my present invention that it is adapted to be used in ovens unprovided with laterally extending ledges for the support of racks or other food supports, although I may provide all insertable and removable embodiments of my invention with front frame elements 11 having holes for screws 59 drilled therethrough, I may also provide each organization which includes the front and rear frame elements 11 and 12 with pivotally revoluble and adjustable threaded means favorable to their insertion even in ovens having enameled or other special linings,—through which screw holes cannot or should not be cut. For example, I may provide, as on the offsets 58 of the arms 57, or directly upon one or both of the end frame elements (as the rear end frame elements 12) clamping elements comprising screws 73, shown as rotatable by milled or squared heads 74 and as extending through rotatively adjustable brackets 75, each bracket being retained in any desired angular position relatively to adjacent walls by means of a screw 76. As suggested at 77, Fig. 1, the ends of all or some of the screws 73 may be swiveled or otherwise revolubly connected with smooth or roughened terminal discs, adapted to make a flat contact with an enameled wall, or the like; but I may ordinarily prefer to provide some or all of the screws 73 with comparatively sharp points 78, adapted to contact at any desired angle with an adjacent wall and to enter or engage the same in such manner as to retain the entire organization in its intended position.

As will be appreciated from an inspection of Figs. 1 and 6, the pivoting of the brackets 75 upon the offsets 58 is favorable as permitting the rotation of said brackets, and the screws 73 extending therethrough, in a horizontal plane,—so that one of a pair of such screws (as the screw shown at the right of the mentioned figures) may be directed against a lateral surface (such as the side wall of an oven 77 provided with an enameled lining 78) another of said screws, as that shown at the left of the front of the mentioned figures, being optionally so rotated as to extend forwardly,—as for the purpose of contacting with a vertical front surface immediately below (or above) an oven door opening.

It is believed that the mode of operation of my novel rack-handling organization will be clearly understood from the foregoing description of the construction and use of the respective parts thereof; but I may emphasize, in conclusion, the fact that, so far as concerns the actuating mechanism for advancing and retracting the bridge 20, or its equivalent, any of the means described in my mentioned patent are suitable for alternative use herein; and the fact that important unique features of the organization upon which protection is herein sought include the following: (1) the employment of a plurality of rack-advancing arms, spaced apart, and preferably distinct from a rack-retracting post or arm, shown as disposed therebetween (2) the provision, upon each rack or other food support, of a locking means connectable at will with said rack-retracting post or arm; (3) the provision of means obviating all need for rack ledges upon the interiors of ovens,—thereby rendering it practicable to use enameled surfaces therein; and (4) the provision of means adapting my described organization either to be inserted in ordinary ovens, or to be built into new ovens by the manufacturers thereof,— said organization being, in any event, insertable either in an upright or an inverted position and identical arms or posts being adapted to handle a plurality of food supports.

Although I have herein described a single complete embodiment of my invention, suggesting various alternatives, it should be understood not only that many features of my invention are capable of independent use, but also that numerous additional modifications might be devised, by those skilled in the art to which this case relates, without the slightest departure from the spirit and scope of my invention, as the same is indicated above, and in the following claims:

I claim as my invention:

1. In an organization of the general character described: a plurality of substantially vertical food-support advancing arms secured at but one end and spaced apart upon a transversely extending member which is movable to and from the rear of an oven; and means for imparting movement to said member.

2. In an organization of the general character described: a plurality of food-support advancing arms secured at but one end and spaced apart upon a transversely extending member which is movable to and from the rear of an oven; and means for imparting movement to said member; said arms being provided with means for the removable retention of food supports.

3. In an organization of the general character described: a plurality of substantially vertical food-support advancing members spaced apart upon a transversely extending member which is movable to and from the rear of an oven; and means for imparting movement to said member; said members being provided with notches to receive the inner end of a food support.

4. In an organization of the general character described: a plurality of substantially vertical food-support advancing arms spaced apart upon a transversely extending member which is movable to and from the rear of an oven; means for imparting movement to said member; and a retracting member disposed between said arms.

5. In an organization of the general character described: a plurality of substantially vertical food-support advancing arms secured at but one end and spaced apart upon a transversely extending member which is movable to and from the rear of an oven; means for imparting movement to said member; and means for guiding said member.

6. In an organization of the general character described: substantially vertical food-support advancing means secured at but one end and movable to and from the rear of an oven; means for imparting movement to said member; and forwardly disposed revoluble means for carrying a food support during its advance or retraction.

7. In an organization of the general character described: a plurality of substantially vertical food-support advancing arms secured at but one end and spaced apart upon a transversely extending member which is movable to and from the rear of an oven; means for imparting movement to said member; and means adapted to roll upon a fixed axis beneath a food support during its advance or retraction.

8. In an organization of the general character described: means removably securing and supporting a food shelf at an elevation within and above the bottom of an oven unprovided with lateral ledges; and means for advancing and retracting said food support relatively to some of said supporting means.

9. An oven provided with pairs of rollers, supported upon fixed horizontal axes near the front of said oven, to carry food supports; and a removable bridge element extending transversely of said oven and provided not only with means for its advancement and retraction but with three upright arms,—outside arms being provided with means for carrying and advancing said food support and an intermediate arm being engageable for the retraction of said food support.

10. In combination with a food support handling organization adapted for use in an oven; a food supporting shelf; shelf advancing means; and a shelf retracting element, said shelf being provided with a longitudinally extending shaft, and said shaft having means at one end thereof for its releasable connection with said retracting element.

11. In combination with a food support handling organization adapted for use in an oven: a food supporting shelf; shelf advancing means; and a shelf retracting element, said shelf being provided with a longitudinally extending shaft, and said shaft having means at one end thereof for its releasable connection with said retracting element and means at the opposite end thereof for releasing said shaft from said retracting element.

12. In an organization of the general character described: an oven having a lining therein; a food supporting shelf; shelf supporting means mounted in said oven above the bottom thereof; said supporting means comprising stationary arms having shelf supporting rollers thereon and movable arms; means for advancing and retracting said movable arms relative to said stationary arms; and means engaging said lining for removably holding said shelf supporting means within said oven.

In testimony whereof I have hereunto set my hand at New York City, New York, this 13th day of October, 1925.

WILLIAM PARKE.